Feb. 9, 1965  R. H. THORNER  3,168,942
THROTTLE CONTROL MECHANISM
Filed Aug. 27, 1959  4 Sheets-Sheet 1
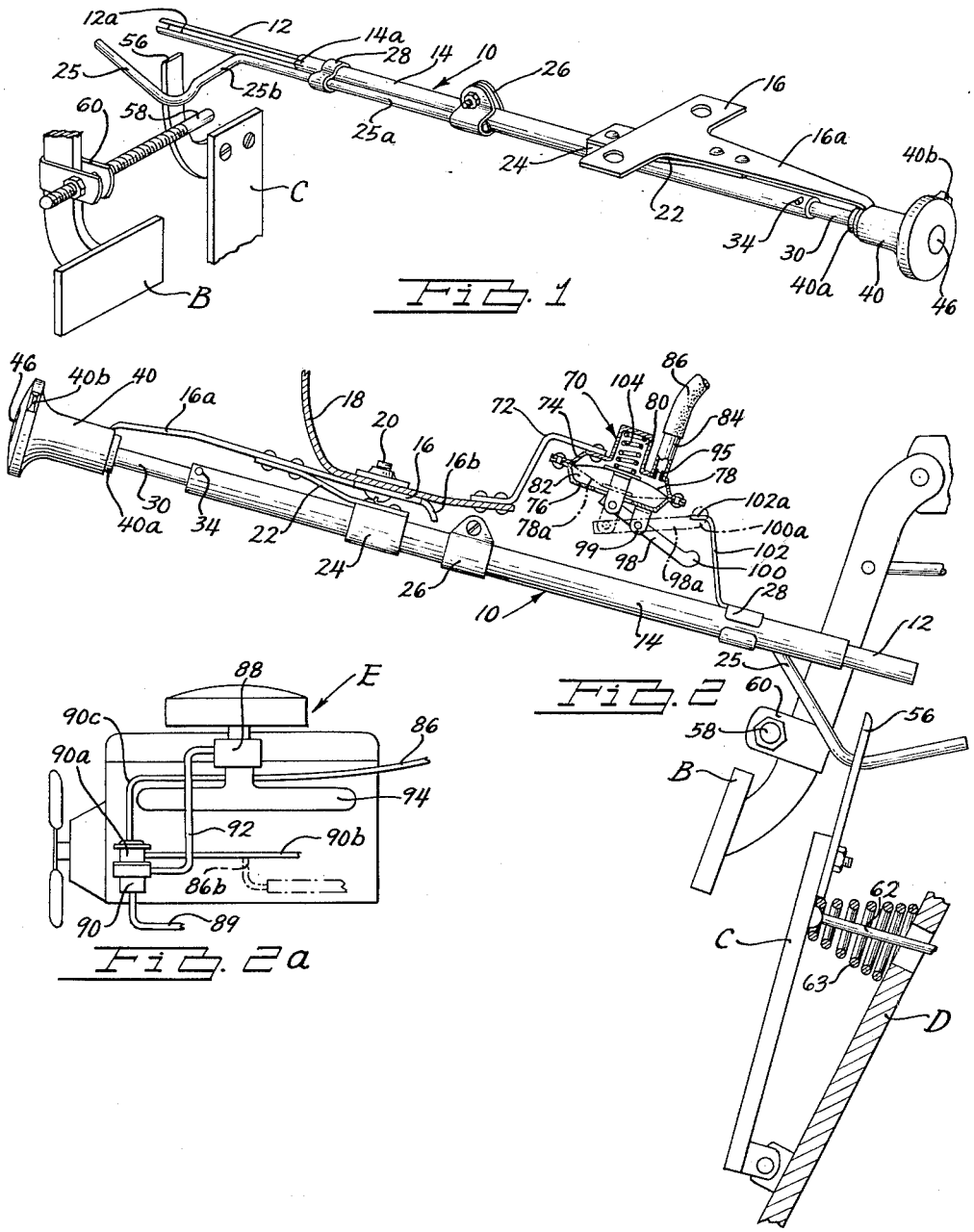
INVENTOR.
ROBERT H. THORNER
BY
ATTORNEY

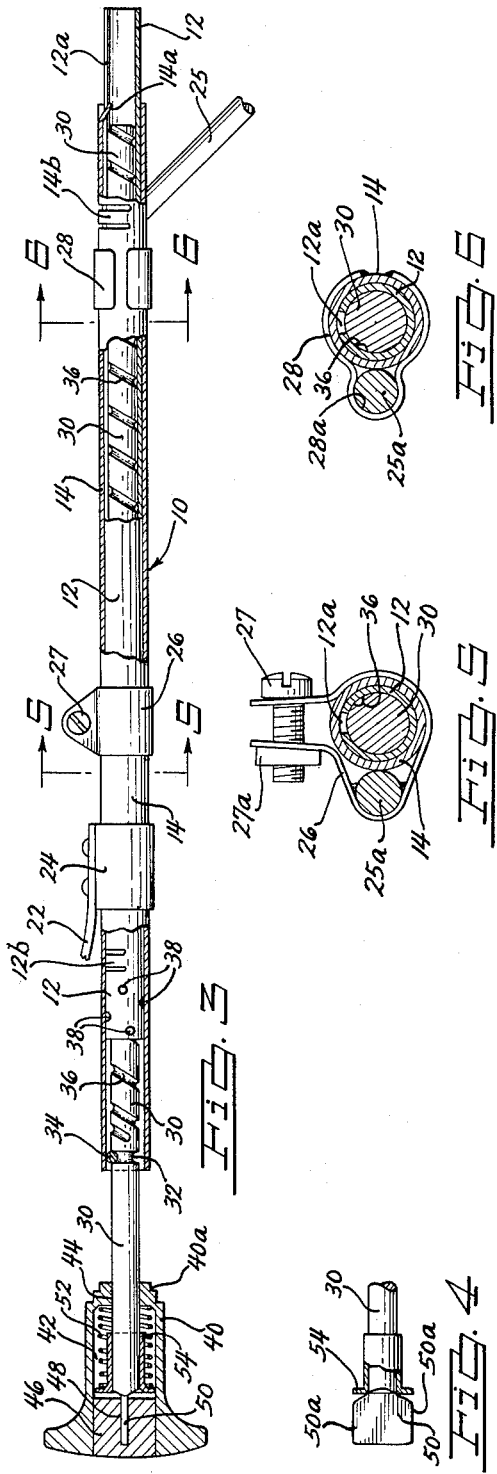
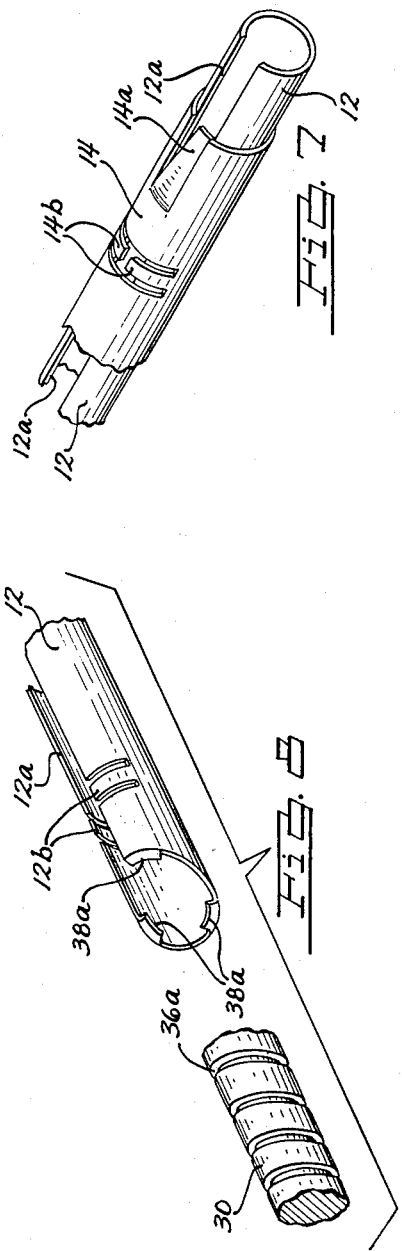

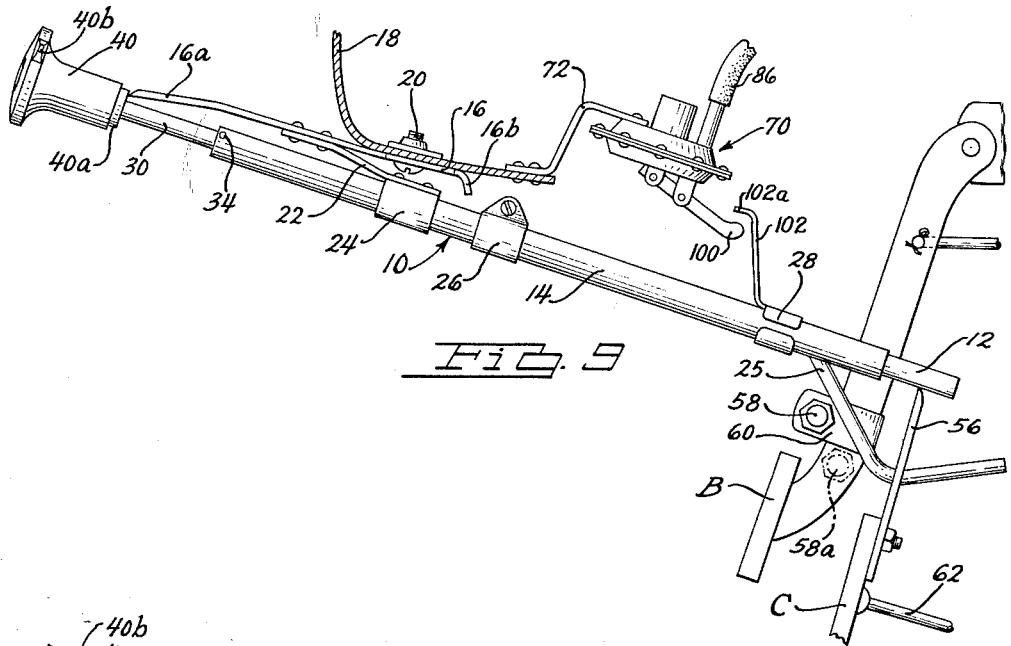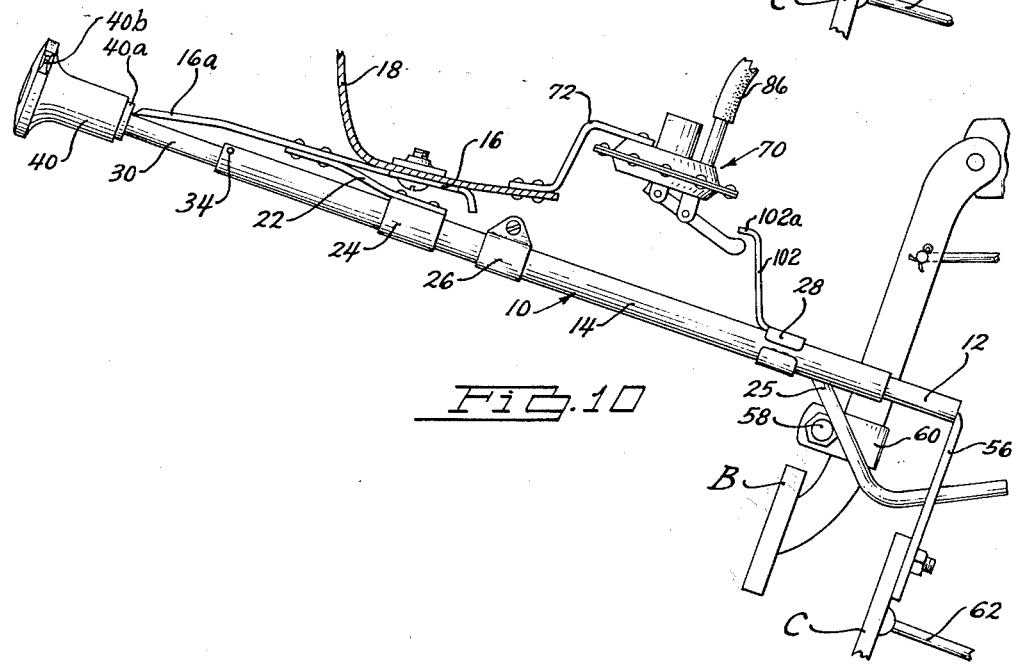

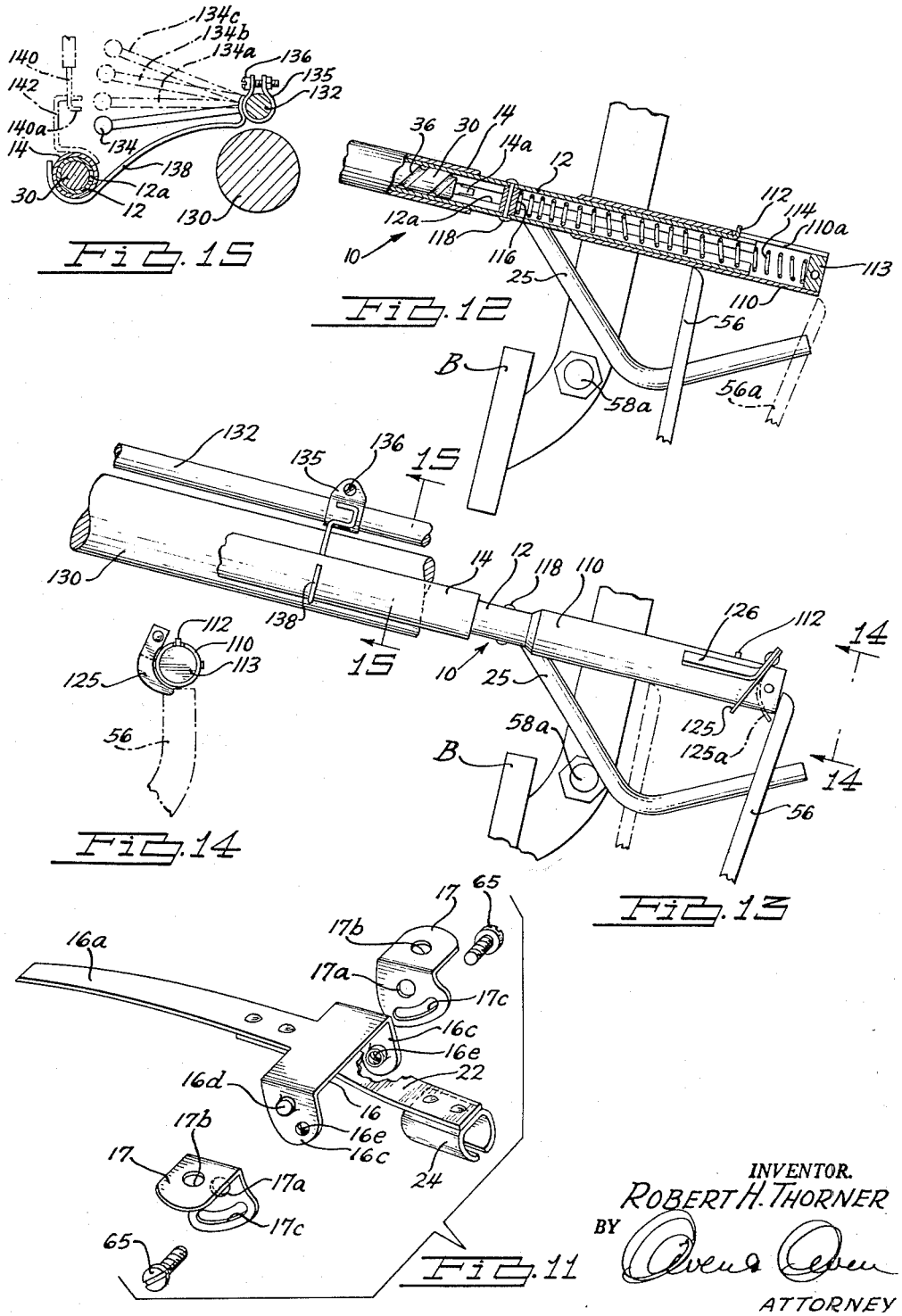

United States Patent Office 3,168,942
Patented Feb. 9, 1965

3,168,942
THROTTLE CONTROL MECHANISM
Robert H. Thorner, 3410 W. Chicago Blvd., Detroit, Mich.
Filed Aug. 27, 1959, Ser. No. 836,419
42 Claims. (Cl. 192—3)

This invention relates to an improvement in a control device to position the control means or throttle of an automatic vehicle whereby the driver may rest his foot and leg during sustained driving periods. In one form the invention may be associated directly with the accelerator pedal, preferably in connection with the brake actuating mechanism.

This application is a continuation-in-part of my copending applications, Serial No. 453,745, filed September 2, 1954, entitled "Throttle Control Device," now Patent No. 2,917,142, and Serial No. 712,847, filed February 3, 1958, now Patent No. 3,114,427, issued Dec. 17, 1963, entitled "Control Apparatus for a Motor Vehicle Regulator."

A primary object of the present invention is to provide a device to control the throttle of an automotive vehicle which is extremely simple in construction, and comprises a novel telescoping tubular unit which complements the vehicle while improving the simplicity of operation, and is instantly inactivated by depression of the brake pedal such that all parts of the device are moved completely clear of the normal path of travel of the accelerator and brake pedals in a direction transverse to the direction of travel of the accelerator.

Another object of the present invention is to provide a device to control the throttle of an automotive vehicle as described in the preceding paragraph including novel adjusting means to permit installation of the device in different designs and models of automotive vehicles.

Another object of the present invention is to provide a device to control the throttle of an automotive vehicle which includes novel hinge-type means for mounting the device to a fixed portion of the vehicle.

An important object of the present invention is to provide, in a device to position the throttle of an automotive vehicle, novel and simple means to select the proper throttle position (and hence speed setting) without requiring that the driver remove his sight from the road.

Another very important object of the present invention, originally presented in said copending application, Serial No. 453,745, now Patent No. 2,917,142, is to provide a throttle control device for an automotive vehicle which is instantly inactivated by depression of the brake pedal without locking the device out of operation, and can be re-activated merely by normal depression of the accelerator without any other manual operation such as pulling knobs or pushing buttons.

Another object of the present invention is to provide a device to control the throttle of an automotive vehicle as described in the preceding paragraph wherein the device is released but does not lock out of operation upon a predetermined travel of the brake pedal to a first predetermined position thereof and can be re-activated merely by normally depressing the throttle, but in which the device does lock out of operation upon a further travel of the brake pedal to a second predetermined position thereof to stop the vehicle.

A further object of the present invention is to provide a device to control the throttle of an automotive vehicle, which device includes means to automatically render it inoperable after the vehicle has been stopped and prior to a subsequent driving of the vehicle.

Another object of the present invention is to provide a device to control the throttle of an automotive vehicle as described in the preceding paragraph wherein any degree of application of the brake pedal causes the device to release the accelerator without ever locking the device out of operation to permit re-activation of the device merely by normal depression of the accelerator during all driving conditions, and the device is rendered inoperative by the automatic means when the vehicle is not operating.

Other objects and advantages of the invention will become apparent from the following description and from the accompanying drawings, in which—

FIG. 1 is a perspective view of one form of the invention as viewed from the driver's left side;

FIG. 2 is an elevational view as seen from the driver's right side of the form of my throttle control mechanism shown in FIG. 1, with added apparatus to automatically move and maintain the device out of operation whenever the engine is not operating, the device being shown in its inoperative or "locked-out" position, and vehicle parts being diagrammatically indicated in section;

FIG. 2a is a view of a typical automotive engine to show its intake manifold and vacuum tubes therefrom used in the form of my invention shown in FIG. 2;

FIG. 3 is an enlarged sectional view, with parts in full, of a portion of the device shown in FIGS. 1 and 2 showing the novel speed regulating mechanism forming a part of the present invention;

FIG. 4 is a fragmentary elevational view of a portion of the adjusting shaft at its point of connection to the adjusting knob;

FIGS. 5 and 6 are enlarged sections taken along lines 5—5 and 6—6, respectively, in FIG. 3;

FIG. 7 is a fragmentary perspective view showing details of the tubular construction shown in FIG. 3;

FIG. 8 is a fragmentary, telescopic perspective view showing an alternate form of threading means of the inner tube shown in FIG. 3;

FIG. 9 is a side elevation of the form of the invention shown in FIG. 2 with the knob pulled out to place the device in the inactive but ready or "coasting" position;

FIG. 10 is a side elevation of the form of the invention shown in FIG. 2 with the device moved into its operating position;

FIG. 11 is an exploded perspective view of a modified mounting means to provide angular adjustment for adapting the control device to a number of different vehicles;

FIG. 12 is a fragementary sectional view of a modified form of the invention;

FIG. 13 is a fragmentary side elevational view of the form of the invention shown in FIG. 12 with the control device in its active or operating position;

FIG. 14 is an end elevational view taken as indicated by line 14—14 in FIG. 13; and FIG. 15 is a fragmentary sectional view along the line 15—15 of FIG. 13, showing means controlled by the vehicle transmission selector member for automatically inactivating the throttle control device of the present invention.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not limitation.

Referring to the drawings and particularly to FIGS. 1–3, the present invention is shown, by way of illustration, as applied to an automotive vehicle for the purpose of controlling the throttle and hence the flow of gas mixture to the engine and thus to establish the speed of the engine. The conventional brake pedal B and accelerator pedal C are shown in their operative relation. It will be appreciated that any kind of automotive vehicle and engine may be controlled by my invention, as well as the usual throttle-controlled gasoline engine. The term "throttle" as used herein is intended to embrace the speed controlling member of any engine, such as the fuel pump of a diesel engine or the fuel control of an automotive gas turbine engine, for example. The term "control means" includes the throttle, plus its operating linkage including the accelerator when they are operatively connected to the throttle to effect movements thereof.

The form of the invention shown in FIGS. 1–3 includes an arm or lever assembly 10, which comprises an inside detent tube 12 telescoping within an outside tube 14 and axially slidable in relation thereto. A mounting bracket 16 is secured to any fixed portion of the vehicle such as to the underside of the vehicle instrument panel 18 by any suitable means, as by screws and nuts 20. The bracket 16 includes a latch extension 16a, for purposes to be described, which has secured thereto a leaf spring member 22 by suitable means as by rivets. The other end of leaf spring 22 is secured, as by rivets, to a bracket 24, which is secured to the outer tube 14. The leaf spring 22 acts as a support and hinge for the tubular assembly 10 to facilitate angular or arcuate movements with respect to the mounting bracket 16 and its extension 16a, but limited by a stop extension 16b.

The outer tube 14 carries a bayonet-type cam piece 25, preferably made of metal rod, and secured to the tube by the brackets 26 and 28, shown best in FIGS. 1, 3, 5 and 6, and to be discussed further.

A rod or shaft 30 (shown partially in FIG. 3) is carried by the inside tube 12 and inserted within its bore and having sufficient clearance for free movements relative thereto. To prevent axial movement of shaft 30 in relation to tube 14 while permitting unrestricted relative rotary movement thereof, the device includes a peripheral groove 32 in the shaft 30 which receives a pin 34, such as a "roll-pin," press-fitted through a portion of the outer tube, as shown in FIGS. 1 and 2.

The shaft 30 also includes a thread 36 (FIG. 3) preferably having a fast advance rate, such as three threads per inch, for reasons to be discussed. The inside tube 12 has suitable portions pressed into the thread, such as a plurality of "dimples" 38 depressed in alignment with one complete thread, for example. The inside tube 12 includes a longitudinal slot 12a, FIGS. 1, 3, 5, 6 and 7, formed in its entire length to receive a tab 14a of tube 14 bent into the slot, as shown best in FIGS. 3 and 7. With this construction, as the shaft 30 is revolved, tube 12 is prevented by tab 14a from rotation in relation to tube 14, and hence is forced to move axially in relation to tube 14 as the dimpled portions of tube 12 follow the thread 36. The effective length of the assembly is thereby adjustably increased or decreased.

Referring to FIGS. 3 and 4, the shaft 30 carries a knob having a large bore 42, and another smaller bore 44 to permit free axial sliding movements with respect to shaft 30. A plug 46 is press-fitted into bore 42 and in the forms shown, includes a slot 48 cooperating with a flat 50 formed on the end of the shaft 30. The flat must be thin enough to provide a width slightly greater than the diameter of bore 42, preferably having its outer ends 50a turned to a diameter slightly less than that of bore 42 to align the axis of shaft 30 and knob 42. A low-rate spring 52 is inserted between the end wall of knob 40 and a spring retainer 54 which abuts against the flat, as shown best in FIG. 4, to urge the knob in a rightwardly direction as viewed in FIG. 3. With this construction, the knob can always be pulled freely outwardly in an axial direction relative to shaft 30 for reasons to be described; but rotation of the knob in any axial position will simultaneously rotate shaft 30 to move tube 12 axially in relation to tube 14 as above described. As shown in FIG. 3, clockwise rotation of knob 40 causes tube 12 to extend with relation to the tube 14, and counterclockwise rotation of the knob causes the tube 12 to contract into its tube 14. The knob 40 includes one or more cylindrical steps 40a, disposed to cooperate with the extension 16a in selecting the desired operation of the control device, in a manner to be described.

The operation of the throttle control device with only the mechanism described thus far is as follows. Referring to FIG. 2, the throttle control is shown in its inoperative or "off" position in which the knob 40 is urged into its most rightward position by spring 52, and the end of extension 16a rests on the outer large diameter of the knob shank.

In this position the leaf spring 22, which is pre-bent to provide a downward spring action, urges the tube assembly to move angularly in a clockwise direction about leaf spring 22 acting as a hinge in addition to the gravity forces acting on the heavier righthand portion of the tube assembly. Such angular movement is prevented by safety-means comprising the periphery of the shank of knob 40 abutting upward against the rigidly-mounted extension 16a as shown in FIG. 2. In this position, the tube 12 is maintained above and completely clear of an accelerator extension 56, so that the throttle-control device is rendered inoperative in the position shown in FIG. 2, just as though it were entirely removed from the vehicle.

In order to activate the device two steps are required; the first step being illustrated in FIG. 9 and the second step in FIG. 10. Referring to FIG. 9, the knob 40 has been pulled out (to the left) by the operator so that the end of extension 16a rides over step 40a into the position shown slightly above shaft 30 while tube 12 rests on the end of extension 56 due to the pre-bent force of spring 22 and gravity, as above described. In this position, as well as in FIG. 10, the knob is urged axially against the end of extension 16a by spring 52. The device is now in its inactive position still not in operation, and can now be compared to a gun which is "cocked" and ready to "fire."

The driver depresses the accelerator in a normal manner, which is the second operational step, until extension 56 passes beyond the end of tube 12. At this time the forces of spring 22 and gravity cause the tube assembly to move into the position shown in FIG. 10, and the operator can then remove his foot from the accelerator pedal and the extension 56 will then abut the end of tube 12, its position of adjustment being determined by the degree of extension of the tube 12. The throttle-holder is now activated and resides in its operating position.

In this operating position the end of extension 16a now contacts shaft 30 while cam piece 25 simultaneously contacts a rod or pin 58, or the like, secured to the brake pedal B by a U-clamp 60, for example. The brake pedal illustrated herein is of the suspended type although the push-type may also be used. The device is now in operation and the vehicle will then accelerate slowly to the pre-set level-road speed with accelerator pedal C in a fixed position, and on reasonably level roads will maintain a relatively constant speed. The accelerator pedal may be depressed to any wider opening without restriction if a faster acceleration or temporary higher speed is desired, and will return to the set position after the foot is removed. The accelerator pedal C is connected to the throttle of the engine by means of the linkage 62 extending through the floorboard D and is biased toward idle position by a spring 63, all in a manner well known in the art. Accordingly, by controlling the accelerator pedal, the device controls the engine throttle through the normal accelerator linkage, all of which control means operate as a unit or assembly.

The desired speed is selected by rotation of knob 40 in order to position tube 12 axially, as above described, which in turn positions the accelerator pedal. A novel concept of the present invention is to provide only a single tactile indicator such as a single peripheral discontinuity on the knob combined with a "fast" thread 36, such as three threads per inch, for example. By providing the fast thread, the entire operating speed range (such as 30 m.p.h. to 75 m.p.h.) can be traversed in about two complete turns of the knob 40. If more than two turns of the knob are required, it becomes somewhat difficult to remember the speed calibration. By providing only a singlet tactile indicator in the combination, the operator can "feel" the indicator to observe by touch its angular setting or "clock" positions corresponding to level-road speeds shown on the speedometer, such as 3, 6, 9, 12 o'clock, for example. Thereafter, the operator sets the knob by touch to any memorized "clock" position to obtain the corresponding speed without "removing his sight from the road." I consider the use of visual indications of any kind to be dangerous, particularly at night, since the driver must move his sight from the road to set the speed.

Another novel concept of the present invention is to provide automatic engagement by means of a "coasting" action. Referring to FIG. 10, if the driver partly depresses the brake pedal (without actually applying the brakes) and then removes his foot, the tube 12 is raised sufficiently by rod 58 acting on cam-piece 25 to release the accelerator and its extension 56, and while knob 40 is lowered only into the position shown in FIG. 9. In this position, the step 40a of the knob has not been lowered below the end of extension 16a and the knob cannot snap back to its "off" position to the right as shown in FIG. 2. The vehicle speed then reduces by engine braking while "coasting" since the accelerator is then in its idle position, and the device temporarily resides in its inactive position. The driver can again activate the device automatically without re-setting the knob 40 merely by depressing the accelerator since the extension 56 slides on the guide surface of tube 12 past the end of the tube which then acts as a cam and detent and automatically drops into the position shown in FIG. 10 to position the throttle as above described, while the knob moves upwardly unrestrictedly so that extension 16a again contacts the shaft 30 as shown. When the driver fully depresses the brake pedal, the hand-throttle is moved to its inoperative position (FIG. 2) and is maintained therein by the safety means (elements 40, 40a and 16a in the form shown). Hence in this form of the invention, the device can be moved by the brake pedal means at least to its inactive position with a very short travel of the brake pedal, and to its inoperative position upon a full normal travel of the brake pedal.

I have found that this "coasting" feature of my invention has particular utility in numerous driving situations whenever it is desired to temporarily reduce the vehicle speed. For example, when entering a curve the driver temporarily inactivates the device by partially depressing the brake pedal to "coast" as above described to reduce the speed to a safe value. After the vehicle has traveled sufficiently in the curve to be sure there is no danger, the driver merely depresses the accelerator to move the extension 56 past the end of tube 12 and thus move these parts automatically into engagement without pulling the knob 40, and the vehicle slowly accelerates to resume the set speed unless accelerated faster by the driver. Consider another situation when a driver overtakes a slower vehicle on turnpikes and a second vehicle "traps" the driver's vehicle by passing on his left at a higher rate of speed; the driver then uses the "coasting" procedure to temporarily reduce speed until the road is clear for passing the slower vehicle. Also, when descending a steep hill, the driver can partially depress the brake pedal to temporarily render the throttle holder inactivated and "coast" down the hill without exceeding the desired speed, and he then merely depresses the accelerator without pulling the knob to re-activate the device by automatic engagement. In addition to the use of the "coasting" feature for descending hills, it is important to appreciate that when ascending a steep hill, the driver can merely depress the accelerator unrestrictedly to maintain speed. Similarly, the speed can be increased in any situation merely by depressing the accelerator which has unrestricted travel to its wide-open-position, and unrestricted return to its abutting position shown in FIG. 10.

In the form of the invention disclosed thus far, when the driver fully applies the brakes by depressing the brake pedal to a further second predetermined position, the rod 58 acts on cam piece 25 to raise the tube assembly 10 transverse to the travel path of the accelerator, so that extension 16a is then above the shank of knob 40. At this time the knob 40 is moved rightwardly under extension 16a by spring 52 so that the control device is then in the position shown in FIG. 2 and is locked out of operation in its inoperative or "off" position completely clear of the normal path of travel of the accelerator. The device also can be moved to its inoperative or "off" position at any time by pressing downwardly on knob 40.

In the brake release construction and action described above, the positioning or detent member (tube 12 in FIGS. 1, 2, 9 and 10) is always moved transverse to the normal path of travel of the control means (accelerator C and its extension 56 in these figures). The advantage of this novel transverse release construction is first to enable a completely mechanical and positive release action solely by foot energy and, secondly and very important, the transverse movement produces a release in a very short travel of the brake pedal such as ⅛ inch, for example, since the end of tube 12 merely must slide a short distance off the end of extension 56, and the device is then completely free of the control means.

FIGS. 2, 9 and 10 show a knob 40 having two cylindrical steps 40a, and FIGS. 1 and 3 illustrate a knob having three steps. The steps are provided to perform several functions. First, they provide an audible clicking signal to indicate by sound when the throttle control device is completely locked out of operation. The clicking signal is produced when the end of extension 16a in effect rides over the end of the first step, and the spring 52 causes the knob to move quickly to the right and strike the end of the extension which produces the "click." With two steps, a double click is produced when the brakes are fully depressed; and with three steps (as in FIG. 1), a triple click is produced as the extension rides over the three steps. In each case the last click is produced by the knob hitting the end of shaft 30. Thus, when the brake pedal is only partially depressed for "coasting" no audible signal is heard in the forms shown in FIGS. 1–10. But when the brakes are fully applied, an audible signal indicates that the device is locked out and that the knob must be pulled to re-activate the throttle control.

Another function of the two or three steps 40a is to have the tube assembly 10 raised as high as possible when the device is in "off" position. The first step locks the tube 12 slightly clear of the extension 56; and with a short power brake travel particularly after a brake adjustment, the brake might not travel far enough to raise tube 12 sufficiently for extension 16a to engage the second step. However, even in the first step of 40a with this extreme "tight" brake adjustment the tube 12 still is raised clear of extension 56 and locked out, although only slightly above the extension. With a normal or average brake travel, the extension engages the second and usually the third step to raise the tube 12 even higher when the device is not in operation. Whether one, two or three steps are provided depends on several factors. To avoid making the coating feature too sensitive, the first step must be high enough to permit adequate brake travel after releasing the accelerator for preventing the extension 16a from engaging the first step 40a which would lock the device out of operation. In order to enable automatic re-engagement, the extension must, in effect, ride up the face of the first step of knob 40 without reaching the first step, and after the accelerator is again depressed, the extension 16a automatically "slides down" the knob face and returns to the relative position shown in FIG. 10. Another factor in the number and size of the steps 40a is the geometry of the installation for a given vehicle. For example, if the length of tube assembly 10 to the right of hinge 22 is relatively short, the knob 40 will lower more for a given brake travel. Also, the extent of travel of the knob transversely to extension 16a for a given brake travel depends on the radial position of rod 58 on the brake arm, the angle of cam pieces 25, and the location of rod 58 relative thereto, etc.

Another novel feature of the present invention is the means to provide a controlled friction of tube 12 sliding axially in tube 14. Such friction is provided to prevent the back force of the accelerator spring 63 from causing the tube 12 to reverse the rotation of the shaft 30 due to the fast thread 36. Referring to FIGS. 3 and 8, such novel means may comprise one or more tabs 12b formed by stamping or sawing a pair of parallel slots partially through the tube transverse to the axis thereof. The tabs 12a are then pre-bent outwardly to provide a controlled spring action for producing friction forces when tube 12 is inserted in tube 14 and the tabs are sprung into their original positions by the outer tube 14. The tabs 12a alternately could be bent inwardly to contact shaft 30 for providing the friction forces. In order to concentrate and hence control this spring friction solely at the tabs, the outer diameter of tube 12 is made slightly less than the inside diameter of tube 14 to provide a small clearance therebetween. Similar or additional friction between tubes 12 and 14 can also be provided by a pair of tabs 14b (FIGS. 3 and 7) pre-bent inwardly from the outer tube to apply a spring force on the inner tube 12, which then produces a controlled friction force for maintaining the axial adjustment of the inner tube 12.

FIG. 8 shows an alternate rectangular thread form 36a on the shaft 30. The end of the detent tube 12 may be cut spirally to conform with the path of one thread in the shaft 30. This spiral end includes a plurality of projections 38a bent inwardly to engage the rectangular thread 36a, which functions in the same manner as the thread shown in FIG. 3.

Another feature of the present invention is to provide novel adjusting means so that the throttle control device may be adapted to fit any automotive vehicle. In FIG. 3 it can be seen that the shaft 30 is threaded the entire length of the telescoping tubes. And since the cooperating dimples 38 cover only a short portion of tube 12, the tubes can telescope to almost twice their length so the throttle control device will accommodate a wide variation of distance between the accelerator and the instrument panel of different cars. For this same corresponding variation in the distance of the brake arm B to the instrument panel, the adjustable bayonet rod 25a, is provided as shown in FIGS. 1, 5 and 6. The bayonet rod includes the cam piece 25 (see FIG. 1) offset from the tube 12 by the straight section 25b. This offset is provided so that the pin 58 can be set to clear extension 56 with safety. The pin 58 can be adjusted for different cars merely by setting it in different axial positions in bracket 60 before tightening the locking nuts.

Referring to FIGS. 1, 2, 3, 5 and 6, the guide bracket 28 is fixed to the tube 14, as by soldering or welding and allows free axial sliding movement of the bayonet rod 25a with respect to tube 14. The bracket 26 is fixed to the bayonet rod 25a, as by soldering or welding, but is merely clamped around the tube 14 by the screw 27 and nut 27a. With this novel construction the cam piece 25 can be moved axially merely by loosening the screw 27 and sliding the bayonet rod with its clamp 26 axially through the aperture of the guide 28 to the correct position, and then tightening clamp 26 around tube 14 by screw 27. Since the center of the clamping portion of clamp 26 is offset from the center of the bayonet rod, the assembly tends to resist twisting when forces act on cam piece 25; this is true since the bayonet rod tends to revolve in the bore 28a (FIG. 6) while the clamp 26 which is secured to the rod 25a tends to revolve about the outer tube 14, along a different parallel axis.

FIG. 11 shows an alternate form of mounting to provide angular adjustment of the extension 16a, to compensate for the difference in required angles of the underside of the dash in relation to the accelerator pedal location in different cars. In FIG. 11, the bracket 16 has a pair of downturned ears 16c having circular pivot points 16d disposed to cooperate with holes 17a in the two mounting brackets 17 to form hinge points for the latch extension 16a. The brackets 17 are secured to the instrument panel through holes 17b such that the holes 17a can receive the pivot points 16d. Each of the ears 16c includes a threaded hole 16e disposed to receive a locking screw 65 extending through slots 17c in bracket 17. Thus, the bracket 16 and its extension 16a can be set at any desired angle in different cars, and are then made rigid with respect to the instrument panel by tightening the screws 65.

The throttle control device described thus far is extremely safe for several reason: (1) two conscious manual steps are required to initiate the device, first pull the knob and second depress the accelerator normally, (2) the level-road speed can be pre-set or selected while the device is engaged without removing the eyes from the road by using only the sense of touch, (3) the operator can let the vehicle "coast" by slightly depressing the brake, and re-engage the control device without resetting the knob, (4) release is effected by positive mechanical means so that the energy of the foot forces a release, and no secondary source of energy is relied on, (5) the control device is positively locked out of operation completely clear of normal path of accelerator travel.

Another optional feature of the present invention which may further enhance its safety characteristics, at some extra expense, however, is to provide restraining means that automatically renders the throttle control device inoperative when the engine does not move the vehicle, and cooperates with the "safety-means" as described above (which may be part of or separate from the restraining means) to preclude any possible engagement of the device, for example, while the engine is off. In the form shown in FIGS. 2, 9 and 10, such restraining means comprises a vacuum device or diaphragm unit 70 secured to a fixed portion of the vehicle, such as to the panel 18 by a bracket 72, for example. Referring to FIG. 2, the diaphragm unit includes two housings 74 and 76 having flange portions between which a diaphragm 78 is clamped, as by rivets. The diaphragm, which may be made of any flexible material such as synthetic rubber, forms two chambers 80 and 82. Chamber 80 communicates with a source of vacuum by suitable means, as through a hose nipple 84 and a flexible rubber hose or tube 86. FIG. 2a shows a typical automotive engine E having the usual carburetor 88, fuel pump 90 and its outlet tube 92, and an intake manifold 94. The hose 86, in one form of the invention may communicate with the intake manifold on the downstream side of the carburetor, as indicated in FIG. 2a. With this type of connection, a damping restriction 95 is preferably provided in nipple 84, or elsewhere in the passage 86, to prevent pulsations of the diaphragm in view of the low rate of the biasing spring. The engine fuel pump may include a vacuum booster pump 90a having outlet 90b to the windshield wipers. The hose 86 (FIG. 2) may alternately be connected into outlet tube 90b by a T connection, as at 86b in FIG. 2a, shown dotted. With this connection, the restriction 95 is not necessary, as the vacuum from the conventional booster pump 90a is smooth.

The diaphragm 78 is operatively connected by suitable linkage to actuate a lever 98 fulcrumed at a fixed support 99. The lever includes an actuating end 100 properly contoured to cooperate with an extension 102a of a bracket or arm 102 secured to tube 14, as by soldering. The vacuum force of diaphragm 78 is opposed by a spring 104 acting downwardly as viewed in FIG. 2. Thus, sufficient vacuum pulls diaphragm 78 upwardly and lever 98 into its downmost position shown in FIG. 2, in which the actuating end 100 is completely clear of extension 102a in all angular positions of the tube assembly 10, as shown in FIGS. 9 and 10. The safety aspects of the device can now be understood. With the engine running and vacuum acting on diaphragm 78 to move lever 98 into the position shown in FIGS. 2, 9 and 10, the knob 40 can then be pulled and the throttle control device can be operated as above described just as though the diaphragm unit were not installed. However, after the engine is stopped and the vacuum drops to zero the spring 104, which is strong enough to overpower hinge spring 22, moves lever 98 and its actuating end 100 into their extreme opposite positions (showed dotted as diaphragm 78a, lever 98a and its actuating end 100a). It can be seen in FIG. 2 that the end 100a is raised slightly higher than the normal position of extension 102a when the throttle control is in its inoperative position. Thus, the vacuum device 70 performs two safety functions. First, if the throttle control is engaged and the engine turned off without applying the brakes (as when the control device is used for fast idle), the diaphragm unit will automatically raise tube assembly 10 into the inoperative or "off" position shown in FIG. 2. Secondly, the diaphragm unit prevents any possible activation while the engine is off; even if the knob 40 is pulled out, the tube assembly still is maintained in the "off" position by lever 98.

Several optional types of operation of the throttle control device are possible with the vacuum device 70 or with the transmission shut-off shown in FIG. 15, to be described. Referring to FIG. 9 the pin 58 is shown in an alternate position as 58a, in which the pin projects through a hole provided in the brake arm B, and bracket 60 has been eliminated; the same result could be obtained by lowering bracket 60 and moving the bayonet cam piece 25 leftwardly. The purpose of the lowered positioning of pin 58 is to engage the cam piece 25 at a point sufficiently low that a full depression of the brakes does not lock the throttle control device out of operation. Thus, when the brakes are fully applied, the tube assembly 10 is raised only enough to release the accelerator but not enough to lower knob 40 so it moves under extension 16a to lock the throttle holder in its inoperative position. Thus, with this construction, the operator only must pull the knob once after starting the engine to produce vacuum in chamber 80. Then during all driving conditions, he merely depresses the accelerator to actuate the throttle holder and then removes his foot from the accelerator. When he applies the brakes for a complete stop, the accelerator is instantly released and the throttle holder resides in its inactive (not inoperative) position; but when he again starts the vehicle in motion, he does not have to pull the knob to engage the throttle control, but need merely depress the accelerator pedal beyond its abutting position for activation thereof. This action can be enhanced by omitting the step 40a from the knob 40 as shown in FIG. 2. Thus, with this form of my invention, made possible by the diaphragm unit 70 or the like (FIG. 15), the "coasting" feature above described is extended for use during all braking operations instead of only during engine braking, although the principle is the same for both. When the engine is shut off, the diaphragm unit automatically moves the hand throttle into its inoperative position. One important factor which is particularly desirable in all types of operation of my device, is that it inherently accelerates the vehicle very slowly to the pre-set speed after engagement at a speed less than the set speed, so the operator never has to look at the speedometer once he learns the "clock" positions of the knob 40. This same automatic engagement can be obtained with automatic type speed controls (which include governor mechanisms) as disclosed in my copending application, Serial No. 712,847, filed February 3, 1958.

Still another optional type of operation is made possible by reducing the diameter of diaphragm 78, with hose 86 connected directly to the intake manifold vacuum and with damping restriction 95 installed, all as shown in FIG. 2. With this construction without changing spring 104, when the throttle is opened sufficiently during acceleration to reduce the manifold vacuum below a predetermined range or value, spring 104 is strong enough to raise tube assembly 10 clear of extension 56 so that tube 12 will disengage from its position in which it can abut the extension 56. By properly selecting the rate and initial travel of spring 104, the tube 12 will be raised initially at any desired vacuum, such as 5 inches of mercury, for example, and will continue to be raised gradually until the vacuum drops to 2 inches of mercury, for example, at which time the effective force of spring 104 enables the knob 40 to move under extension 16a so the device actually locks in the inoperative position shown in FIG. 2. With this construction, as long as the operator accelerates gradually, he can engage the throttle control device (as shown in FIG. 10) as above described. But if the operator accelerates too rapidly by a sudden fast depression of the accelerator pedal, then the device will not engage; and a very rapid acceleration either prior to engagement or from an engaged position (as for passing other vehicles) will cause the throttle control to lock out completely, in which case the knob 40 must be pulled out to again initiate the controlled operation of the vehicle. In this action, instead of locking out completely when accelerating rapidly, by deleting steps 40a entirely if desired, the throttle control will only release the accelerator and can be reengaged merely by depressing the accelerator pedal in the "coasting" type of operation above described. With this construction and type of operation, the throttle control device tends to discourage too rapid starts and acceleration, but permits the device to be used for city as well as country driving with safety. With the larger diaphragm, or when the smaller diaphragm is connected to the tube 90b, or without any diaphragm unit, the device can be engaged at any time after pulling the knob, and the vehicle will accelerate automatically but slowly to the set speed, unless the operator desires to accelerate faster by depressing the accelerator.

Another additional feature of the present invention is shown in FIGS. 12 and 13, and has great utility with the "coasting" operation, whether only for engine braking or full braking in all forms of my invention thus far described, and is particularly useful when the "coasting" feature is used with the diaphragm unit 10 or the transmission control to be described.

Referring to FIG. 12, the pin 58a is illustrated in the lowered position on the brake arm as would be used to provide the "coasting" feature with full braking as well as engine braking for example. In FIG. 12 the tube 12 is either made longer, or the throttle control device is used in automotive installations where tube 12 can be extended sufficiently to accommodate the device of FIG. 12.

Referring to the figures, a short tube extension 110 is illustrated which is freely slidable axially of tube 12 and includes a slot 110a for a portion of its length, as shown in FIG. 12. Tube 12 includes a stop 112 formed by bending a short portion of the tube upwardly to guide the tube extension by cooperating with the slot 110a and act as a rightward limit for tube 110 when the left end of slot 110a abuts the stop 112. A plug 113, or the like, is inserted in tube 110 and suitably secured thereto by pinning, soldering, etc., and acts as a leftward stop for movement of tube 110 when plug 113 abuts the right end of tube 12. A relatively long, low-rate compression spring 114 is inserted between plug 113 and another plug 116 suitably secured to tube 12, as by the rivet or pin 118. The force of spring 114 is always large enough to force tube extension 110 to its extreme travel to the right (as shown in FIG. 12) when the tube assembly 10 is raised clear of the accelerator. At this time, an audible signal in the form of a clicking sound is produced when the left end of slot 110a strikes the stop 112 which indicates that the accelerator is released. Then, when the accelerator is depressed to carry its extension to the dotted position 56a, shown in FIG. 12 (now further than the end of tube 12) the tube assembly drops into its operating position. In this movement, an audible clicking signal is produced when cam piece 25 strikes pin 58a to indicate to the driver that the device is engaged. The force of the accelerator return spring 63 is always greater than the force of spring 114, so that after the foot is removed from the accelerator, the accelerator extension 56 forces tube 110 to its extreme leftward position, as shown in FIG. 13, and the throttle control device is then in operation to hold the accelerator. In this manner, the tube extension 110 acts as a lost-motion member for the accelerator extension 56. When the brake pedal is depressed, pin 58a acts on cam piece 25 to raise tube 110, whereupon the accelerator moves leftward to idle position while tube 110 snaps rightwardly to the position shown in FIG. 12 with the first above described clicking signal to indicate release.

If a louder audible signal is desired to indicate activation of the device, the extension 56 may be caused to engage a leaf spring "clicker" 125 (see FIGS. 13 and 14) secured to and supported by a bracket 126 carried by tube extension 110. As the extension 56 moves to the end of tube 110, it carries leaf spring 125 to the position shown in 125a. The leaf spring is contoured to release when extension 56 is slightly past the tube 110. As the extension moves into the position shown in FIG. 13, the leaf spring snaps to its free position and produces an audible clicking signal to indicate to the driver that the device is engaged in its active or operating position.

In normal driving of an automotive vehicle, the driver accelerates by moving the accelerator and throttle to a position corresponding to a speed much higher than the intended driving speed. When the vehicle speed approaches the desired driving speed, the driver subconsciously "throttles back" to maintain this desired speed. This inherent characteristic in driving, without the tube extension 110 and when using the "coasting" feature can sometimes cause actuation of the throttle control during a slight acceleration of the vehicle. It would be preferable however, to require slightly greater depression of the accelerator than for the driving position.

With the construction shown in FIGS. 12 and 13 when accelerating slowly, as when the driver is following other cars at less than the set speed, the extension 56 will not travel to the end of tube extension 110, so he can follow the other cars by driving normally without actuating the device. When the other cars speed up or the traffic clears, the driver depresses the accelerator normally to accelerate and engage tube 110 indicated by one of the clicking signals described above. The tube 110 and accelerator then move back leftwardly to the position shown in FIG. 13, and the driver can remove his foot, if desired, and the device will slowly accelerate the vehicle to the pre-set speed, unless the driver wishes to accelerate by foot. I have found in tests of one make of car that when the tube extension 110 requires about one-half inch extra travel of the extension 56, the driving is about optimum. However, the amount of travel of tube extension 110 can vary from one car to another due to accelerator geometry. If desired, the tube extension concept can be used with only engine brake coasting, wherein the device locks out in its inoperative position upon each full vehicle-braking action, as described in relation to FIG. 2 with pin 58 in the position shown therein.

A second, and very important form of restraining means of the present invention which may be used in place of the vacuum device 70 is illustrated in FIGS. 13 and 15. These figures show a conventional steering post 130 and transmission selector rod or shaft 132 operated by a manual control lever 134, all part of a typical automotive vehicle. The manual control lever 134 and shaft 132 comprise elements movable selectively by the vehicle-driver. A bracket 135 is clamped to rod 132, as by a screw and nut 136, and has secured thereto, as by soldering a piece of music or spring wire 138, or the like, extending under tube 14. The wire piece 138 is pre-bent upwardly to provide a predetermined upward force on tube assembly 10. The control lever 134 is shown in "drive" position of an automatic transmission in FIG. 15, which would correspond to first and third gear angular positions of the control lever for a standard step-shift transmission. With the lever in this "drive" position, the upward force of wire piece 138 is overpowered by the force of spring 22 and the gravity forces acting on tube assembly 10, so that the control device can be activated in a normal manner as above described. When the control lever 134 is moved to neutral, reverse, or "park" (in some automatic transmissions) shown in dotted position 134a, 134b and 134c, respectively, the upward force of wire piece 138 is greater than the force of spring 22 plus the weight of the tube assembly 10. Hence, after braking the vehicle to a stop, whereby pin 58a acts on cam portion 25 to raise tube 110 clear of extension 56, the wire piece moves the throttle control device to its inoperative or "off" position in neutral, reverse, (and "park" if provided) settings of the lever 134, as illustrated in FIG. 15. In a step-shift transmission, the throttle control device would be locked out in neutral, reverse, and second gear positions with the arrangement illustrated in FIG. 15. When the lever 134 is returned to drive (or third gear) position, the knob 40 then must be pulled deliberately to set the throttle control device in its inactive portion ready for activation.

For conventional "push-button" type of transmission controls, the "neutral" button (not shown) would be connected to actuate a Bowden wire 140 (shown dotted) projecting through a U-bracket 142 suitably secured to tube 14, as by soldering. The Bowden wire has a limit 140a bent to provide a lost motion action when wire 140 slides through a hole in bracket 142. When the "neutral" button (not shown) is inactive, the wire end 140a is moved downwardly sufficiently to permit normal operation of the throttle control device. But when the "neutral" button is activated (pushed), the wire end 140a pulls tube assembly 10 upwardly to move the throttle control device into an inoperative position. The restraining means shown in FIG. 15 can be used with any of the forms of my invention shown herein in place of the vacuum device 70.

The form of safety release shown in FIG. 15 accomplishes the purpose intended while enabling the throttle holder to set the accelerator in a position for fast idle. This is a result of the action of the wire 138 being the equivalent of a lever with a spring at its end. If the transmission control lever is in "neutral," and knob 40 is raised (and held temporarily in this raised position) to lower tube assembly 10, and the accelerator is then depressed, the device will be engaged as shown in FIG. 13. Although wire 138 applies an upward force on tube assembly 10, the friction caused by extension 56 against tube extension 110 holds the parts in place for fast-idle. As soon as the brake is depressed, wire 138 moves and maintains extension 110 clear of extension 56 until the transmission lever is in "drive" position.

I wish it understood that my invention is not limited to any specific construction, arrangement or form of the parts, as it is capable of numerous modifications and changes without departing from the spirit of the claims.

What I claim is:

1. In a control device for an automotive vehicle having an engine, said vehicle having brake actuating means and having engine control means normally urged toward the idle-speed position, the combination of, means including movable means for positioning said control means in any predetermined fixed position, release means operatively associated with said brake-actuating means to effectively inactivate said movable positioning means with respect to said control means after a predetermined movement of said brake-actuating means, said release means including means responsive to movements of said brake-actuating means to transmit forces therefrom to cause said inactivation of said movable means irrespective of a failure of any source of power in any part of the vehicle whenever the device is in operation to position said control means, and means to effect automatic operative engagement of said movable means and said control means after movement of said control means in an increase-speed direction to a fixed position thereof between that for idle and maximum speed at which fixed position said engagement is automatically effected.

2. In a control device for an automotive vehicle having an engine, said vehicle having brake actuating means and having engine control means normally urged toward the idle-speed position, said vehicle also including an element movable selectively by the vehicle-driver incident to normal operation of the vehicle, the combination of, means including movable means for positioning said control means, release means operatively associated with said brake-actuating means to effectively inactivate said positioning means with respect to said control means after a predetermined movement of said brake-actuating means, said release means including means responsive to movements of said brake-actuating means to transmit forces therefrom to cause said inactivation of said movable means irrespective of a failure of any source of power in any part of the vehicle whenever the device is in operation to position said control means, restraining means operated as a result of said movement of said element to effectively move said positioning means into an inoperative position out of operation with respect to said control means, manually controlled means associated with said restraining means in a first operational step to release said positioning means from its inoperative position to an inactive position without operatively engaging said control means, and said movable means including means in a second operational step to effect automatic operative engagement of said movable means and said control means after sufficient movement of said control means in an increase-speed direction.

3. The combination of elements defined in claim 2, in which said vehicle includes a transmission, and said element comprises selector means for said transmission movable at least into neutral and driving positions, and said restraining means being operated by said transmission selector means and operatively associated with said mechanism to effectively maintain same in said inoperative position at all times when said selector means is placed in at least one position different from said driving position, and to automatically enable said mechanism to be manually activated when said transmission selector means is moved at least into said driving position.

4. In a control device for an automotive vehicle having an engine and control means therefor normally urged toward the idle-speed position, the combination of, a mechanism including movable means for positioning said control means, said mechanism including a tube having axial guide means in a wall thereof, a member slidable within said tube having thread means and including means cooperating with said axial guide means to prevent rotary movement of said member with respect to said tube, a manually rotatable speed adjusting member including second thread means cooperating with said first thread means of said slidable member to effect axial adjustment of one of said members in relation to the other of said members, and means to retain one of said members in a fixed axial position with respect to said tube for causing axial movements of the other said member upon rotation of said speed adjusting member for positioning said control means.

5. The combination of means defined in claim 4, in which said slidable member comprises a second tube in telescoping relationship with said first tube, said pair of telescoping tubes having diametrical clearance and axially slidable in relation to each other and requiring controlled friction therebetween, at least one tab formed in at least one of said two tubes transverse to the axis thereof and prebent in its free position in the direction of the adjacent wall of the other tube to project beyond said wall in said free position but sprung back thereto in its operative position for providing a predetermined spring friction force.

6. In a control device for an automotive vehicle having an engine and control means therefor normally urged toward the idle-speed position, the combination of, a mechanism including means for positioning said control means having an outer tube and a second tube telescoping inside said outer tube and axially slidable relative thereto, one of said tubes having an axial guide slot and the other of said tubes having means cooperating with said guide slot to prevent relative rotary movements of said two tubes, manually rotatable shaft means disposed within said inside tube and including first thread means, retaining means operatively connecting said outer tube and said shaft means to prevent relative axial movement thereof but to permit unrestricted relative rotary movement therebetween, said inside tube including second thread means cooperating with said first thread means of said shaft means to effect axial movement of said inside tube upon rotation of said shaft means for positioning said control means.

7. In a control device for an automotive vehicle having an engine, said vehicle having brake-actuating means and having engine control means, the combination of means to hold said control means in any desired predetermined position comprising, movable means including means for positioning said control means in said predetermined position, said movable means also including a tube member, said positioning means including shaft means disposed within said tube member and rotatable in relation thereto, said shaft means including means to effect in relation to said tube member axial movements of said positioning means upon rotation of said shaft means, release means operatively associated with said brake-actuating means to effectively inactivate said positioning means with respect to said control means after a predetermined movement of said brake-actuating means, restraining means to render said positioning means in an inoperative status out of operation with respect to said control means, and manually controlled means associated with said restraining means to release said positioning means from said inoperative status.

8. The combination of elements defined in claim 7, in which said device includes hinge means to mount said movable means to a fixed portion of said vehicle for supporting same and to provide angular movements of said movable means for effecting swingable releasing movements of said positioning means in a direction transverse to the normal path of travel of said control means.

9. The combination of elements defined in claim 7, said device including means to mount said movable means to a fixed part of said vehicle and including means to provide movements of said movable means for effecting releasing movement of said member positioning said control means, a bayonet member carried by said tube member and including a cam-acting portion and axially secured in relation to said tube member, said brake-actuating means including release means disposed to cooperate with said cam-acting portion to move said movable means at least to an inactive position completely clear of the normal path of travel of said engine control means upon normal vehicle-stopping movements of said brake-actuating means, whereby said control means is free to return to its idle position without any possible interference from said movable means, and means to secure said bayonet member to said tube member at any required axial position thereof.

10. The combination of elements defined in claim 7, in which said device includes leaf spring hinge means to mount said movable means to a fixed portion of said vehicle for supporting same and to enable angular movements of said movable means for effecting swingable movements of said positioning member in a direction transverse to the normal path of travel of said control means.

11. In a control device for an automotive vehicle having an engine and control means therefor normally urged toward the idle-speed position, the combination of, a mechanism including movable means for positioning said control means, said mechanism including a tube having axial guide means in a wall thereof, a member slidable within said tube having thread means and including means cooperating with said axial guide means to prevent rotary movement of said member with respect to said tube, a manually rotatable speed adjusting member including second thread means cooperating with said first thread means of said slidable member to effect axial adjustment of one of said members in relation to the other of said members, and means to retain one of said members in a fixed axial position with respect to said tube for causing axial movements of the other said member upon rotation of said speed adjusting member for positioning said control means, said device including swingable hinge means for mounting said mechanism to a fixed part of said vehicle to provide angular movements of said mechanism for effecting a releasing movement of said member positioning said control means in an inoperative position completely clear of the normal path of travel of said control means, said positioning member being swingable about said hinge means into an abutting position with respect to said control means for controlling the speed of said engine during normal operation of said control device, manually actuated means for effecting said releasing movement of said mechanism in a direction transverse to the normal path of travel of said control means at said abutting position, said manually rotatable adjusting member including shaft means, manually controlled knob means operatively connected to said shaft means and axially movable in relation thereto, said shaft means and said knob means being operatively connected to said swingable means for said angular movements therewith, fixed stop means associated with said fixed vehicle part, said knob means being disposed in relation to said stop means in a first axial position thereof to angularly abut said stop means for maintaining said swingable positioning member in said inoperative position, and said knob means in a second manually set axial position thereof standing out of said angular abutting relationship with said stop means to clear same, whereby said swingable positioning member is free to move into its operating abutting position.

12. The combination of elements defined in claim 11, and adjusting means provided to set and lock the angle of said stop means in relation to the fixed part of said vehicle.

13. The combination of elements defined in claim 11, and said knob means including one or more steps on a face thereof to cooperate with said stop means for providing several inactive angular positions and an audible signal produced when said knob means abuts said stop means as it passes each step while the device is moved to its inoperative position.

14. In a control device for an automotive vehicle having an engine and control means therefor normally urged toward the idle speed position, the combination of, a swingable mechanism including means associated with said control means for positioning same, said mechanism including laterally rigid leaf spring hinge means connected to a fixed part of said vehicle to provide angular movements of said positioning means for engaging said control means to hold same for controlling engine speed and to enable disengaging said control means when required.

15. In a control device for an automotive vehicle including an engine and movable control means therefor, the combination of, a mechanism for setting said control means in selected fixed positions, said mechanism having speed-adjusting means consisting of a manually rotatable speed selector member mounted in the operator's compartment, said mechanism also including a positioning member operatively connected to said speed selector member and including threaded inflexible means to provide axial movements of said positioning member by rotation of said speed selector member for setting any desired said fixed position of said control means without visual inspection thereof, said threaded means having a thread rate providing a relatively long travel of said positioning member for each rotation of said speed selector member, said last named member including a single tactile indicator adjacent its periphery to indicate by the sense of touch the angular position of said selector member to enable the vehicle-operator to select the approximate speed of said vehicle by feeling said angular position of said selector member without removing his sight from the road.

16. The combination of elements defined in claim 15, in which said thread rate is low enough to enable traversing the normal operating speed range of the vehicle in not more than substantially two complete turns of said selector member.

17. In a control device for an automotive vehicle having an engine, said vehicle having brake-actuating means and having engine control means normally urged toward the idle-speed position by a return spring, the combination of, a movable mechanism including release means, said mechanism also including positioning means carrying a lost-motion member movable into abutting contact with respect to said engine control means for setting same in a first position to control the speed of said engine, said brake-actuating means including means disposed to cooperate with said release means for moving said mechanism and said positioning means with said lost-motion member out of said abutting contact in a direction transverse to the direction of the normal path of travel of said control means to at least an inactive position completely clear of said path upon vehicle-stopping movements of said brake-actuating means, said lost-motion member being freely slidable in relation to said positioning means in said direction of said path, second spring means acting on said lost-motion member with a force always less than the force of said return spring and urging said member into a second positon a predetermined distance beyond said first position of said control means on the high-speed side thereof when said mechanism is in said inactive position, said mechanism including a surface cooperating with a portion of said control means to maintain said mechanism in said inactive position and to enable said control means to be moved unrestrictedly in an increase speed direction said predetermined distance past said first position to the end of said lost-motion member, means to guide said mechanism and said lost-motion member in said transverse movements reversely from said inactive position to its normal operating position into said abutting contact with said portion of said control means, said force of said return spring then acting on said lost-motion member through said control means portion to overpower said second spring means and move said control means and said abutting lost-motion member to said first position in a reduce-speed direction by said predetermined distance for holding said control means.

18. The combination of elements defined in claim 17, and said positioning means including a first tube member, and said lost-motion member comprising a second tube member in axially telescoping relationship with said first tube member, and said tube members including means to limit the axial movement of said second tube member in said two axial positions thereof to said predetermined distance.

19. The combination of elements defined in claim 17, and said lost-motion member including a leaf spring member arranged to engage said portion of said control means when same is moved past said end of said lost-motion member for providing an audible clicking signal to indicate when said control means is ready for engagement with said member in said abutting contact.

20. The combination of elements defined in claim 17, and said release means and said guide means being arranged to provide automatically said reverse transverse movements of said mechanism from said inactive position to said normal operating abutting position following said movement of said control means past the end of said lost-motion member without requiring other manual operation of said mechanism.

21. The combination of elements defined in claim 17, and said vehicle inclluding an element manually movable by the vehicle-driver, and restraining means operatively associated with said positioning means and operable upon movement of said element to automatically render said positioning means inoperative in relation to said control means when the engine is not moving the vehicle, and to enable said device to be manually activated whenever the vehicle is again being driven.

22. In a control device for an automotive vehicle including an engine and a transmission having manual selector means therefor movable at least into neutral and driving positions, said vehicle having brake-actuating means and having engine control means normally urged toward the idle speed position, the combination of, a mechanism including movable positioning means operatively connected to said control means for controlling the speed of said engine and including release means, said brake actuating means disposed to cooperate with said release means for inactivating said mechanism without rendering same inoperative at least upon vehicle-stopping movements of said brake-actuating means, and restraining means operated by said transmission selector means and operatively connected to said mechanism to maintain same in an inoperative status at all times when said selector means is placed in at least one position different from said driving position, and to automatically enable said mechanism to be manually activated whenever said selector means is moved at least into said driving position.

23. In a control device for an automotive vehicle including an engine and a transmission having manual selector means therefor movable at least into neutral and driving positions, said vehicle having brake-actuating means and having engine control means normally urged toward the idle speed position, the combination of, a mechanism including movable positioning means operatively connected to said control means and movable into abutting contact with respect to said control means for controlling the speed of said engine and including release means, said brake actuating means disposed to cooperate with said release means for moving said mechanism out of said abutting contact in a direction transverse to the direction of the normal path of travel of said control means to an inactive position completely clear of said path at least upon vehicle-stopping movements of said brake-actuating means, and restraining means operated by said transmission selector means and including spring means operatively connected to said mechanism to provide predetermined forces acting thereon to maintain same in an inoperative position when said selector means is placed in at least one position different from said driving position.

24. In a control device for an automotive vehicle having an engine including an intake air passage subjected to vacuum varying as a function of movements of a throttle in the passage, said vehicle having brake-actuating means and having engine control means including said throttle normally urged toward the idle-speed position, the combination of a mechanism including movable positioning means operatively connected to said control means for controlling the speed of said engine and including release means, said brake actuating means disposed to cooperate with said release means for inactivating said mechanism at least upon vehicle-stopping movements of said brake-actuating means, and a vacuum device including a pressure responsive member communicating with said intake passage vacuum and operaitvely associated with said mechanism to automatically move and maintain same in an inoperative status whenever the vacuum in said passage falls below a predetermined value and to automatically enable said mechanism to be activated when said vacuum increases above said predetermined value.

25. In a control device for an automotive vehicle having an engine, said vehicle having normal brake-actuating means and having engine control means normally urged toward the idle-speed position, the combination of, a movable mechanism including release means, said mechanism also including detent means movable into abutting position with respect to said engine control means to control the speed of said engine during normal operation of said control device, said detent means being disposed in relation to said engine control means during normal opertion of said device to prevent movements of said control means in a reduce-speed direction from its abutting position, but to permit completely unrestricted normal manual movements thereof in either direction at any position on the high-speed side of said abutting position of said control means, said detent means being movable in two directions substantially transverse to each other, one of said detent movements being effective to control the speed of the engine, said brake-actuating means including means disposed to cooperate with said release means to move said movable mechanism including said detent means in a second of said two directions to an inactive position completely clear of the normal path of travel of said engine control means upon normal vehicle-stopping movements of said brake-actuating means, a source of fluid pressure produced as a result of vehicle operation, a pressure responsive member adapted to be subjected to a pressure differential caused by said fluid pressure and operatively connected to said detent means for automatically moving and maintaining said mechanism in an inoperative status when said pressure differential falls below a predetermined value, and to automatically enable said mechanism to be activated when said pressure differential again increases above said predetermined value.

26. In a control device for an automotive vehicle having an engine, said vehicle having brake-actuating means and having engine control means normally urged toward the idle-speed position, the combination of means to hold said control means in any desired predetermined first position comprising, means including movable means for positioning said control means, release means operatively associated with said brake-actuating means to effectively inactivate said positioning means with respect to said control means after a predetermined movement of said brake-actuating means, means to effect automatic operative engagement of said movable means with said control means after movement of said control means in an increase-speed direction to a second predetermined position beyond said first position on the high-speed side thereof, means to move said control means and said operatively engaged positioning means in an idle-speed direction to said first predetermined position for holding said control means in said first position, a source of fluid pressure produced as a result of vehicle operation, a pressure-responsive member adapted to be subjected to a pressure differential caused by said fluid pressure and including means for automatically causing a relative movement of said positioning means and said control means to an inoperative status when said pressure differential falls below a predetermined value, said pressure responsive member automatically enabling said positioning means and control means to be activated after said pressure differential again increases above said predetermined value.

27. In a control device for an automotive vehicle having an engine, said vehicle having brake-actuating means and having engine control means normally urged toward the idle-speed position by spring means, the combination of means to hold said control means in any of a plurality of predetermined fixed positions comprising, for positioning said control means including manually adjustable movable means for selecting one of said predetermined positions of said control means to establish the desired speed of the vehicle, release means operatively associated with said brake-actuating means to effectively inactivate said positioning means with respect to said control means after a predetermined movement of said brake-actuating means, said holding means including means to effect automatic operative engagement of said movable means with said control means after movement of said control means in an increase-speed direction to a second predetermined position beyond said first predetermined position on the high speed side thereof in all of said plurality of said positions, said second position being dependent on the setting of said manually adjustable movable means, means to enable said spring means to move said operatively engaged positioning means and said control means in an idle-speed direction to said first predetermined position for holding said control means in said first position, a source of fluid pressure produced as a result of vehicle operation, a pressure-responsive member adapted to be subjected to a pressure differential caused by said fluid pressure and including means for automatically causing a relative movement of said positioning means and said control means to an inoperative status when said pressure differential falls below a predetermined value, manually releasable safety means to maintain said inoperative status of said postioning means in relation to said control means after said pressure-differential again increases above said predetermined value, said pressure responsive member automatically enabling said positioning means and control means to be engaged after said pressure differential again increases above said predetermined value and after said safety means is released manually by the vehicle operator.

28. In a control device for an automotive vehicle having an engine, said vehicle having normal brake-actuating means and having engine control means normally urged toward the idle-speed position and having a transmission with manual selector means therefor movable at least into one non-driving and a driving position, the combination of, a movable mechanism including release means, said mechanism also including detent means movable automatically into abutting postion with respect to said engine control means after movement thereof to a predetermined position by the vehicle-driver to control the speed of said engine during normal operation of said control device, said detent means being disposed in relation to said engine control means during normal operation of said device to prevent movements of said control means in a reduce-speed direction from its abutting position, but to permit completely unrestricted normal manual movements thereof in either direction at any position on the high-speed side of said abutting position of said control means, said detent means being movable in two directions substantially transverse to each other, one of said detent movements being effective to control the speed of the engine, said brake-actuating means including means disposed to cooperate with said release means to cause movement of said movable mechanism including said detent means in a second of said two directions to an inactive position completely clear of the normal path of travel of said engine control means upon normal vehicle-stopping movements of said brake-actuating means, and restraining means operated by said transmission selector means and including means operatively connected to said mechanism to automatically render same in an inoperative status when said selector means is placed at least in one non-driving position and to automatically enable said mechanism to be activated at least when said selector means is moved into said driving position.

29. In a control device for an automotive vehicle having an engine, said vehicle having brake-actuating means and having engine control means normally urged toward the idle-speed position and having a transmission with manual selector means therefor movable at least into one non-driving and a driving position, the combination of means to hold said control means in any desired predetermined first position comprising, means including movable means for positioning said control means, release means operatively associated with said brake-actuating means to effectively inactivate said positioning means with respect to said control means after a predetermined movement of said brake-actuating means, means to effect automatic operative engagement of said movable means and said control means after movement of said control means in an increased-speed direction to a second predetermined position beyond said first position on the high-speed side thereof, means to move said control means and said operatively engaged positioning means in an idle-speed direction to said first predetermined position for holding said control means in said first position, and restraining means operated by said transmission selector means and operatively associated with said positioning means for automatically rendering of said positioning means inoperative in relation to said control means whenever said selector means is placed at least in one non-driving position, manually releasable safety means to maintain said inoperative status of said positioning means in relation to said control means after said selector means is again placed in said driving position, said restraining means automatically enabling said positioning means and said control means to be activated after said selector member is moved into at least said driving position and after said safety means is released manually by the vehicle operator.

30. In a control device for an automotive vehicle having an engine, said vehicle having brake-actuating means and having engine control means normally urged toward the idle-speed position by spring means, the combination of means to hold said control means in any of a plurality of predetermined fixed positions comprising, means for positioning said control means including manually adjustable movable means for selecting one of said predetermined positions of said control means to establish the desired speed of the vehicle, release means operatively associated with said brake-actuating means to effectively inactivate said positioning means with respect to said control means after a predetermined movement of said brake-actuating means, said holding means including means to effect automatic operative engagement of said positioning means and said control means after movement of said control means in an increase speed direction to one of said predetermined fixed positions beyond said idle-speed position on the high speed side thereof, said last-named predetermined position being dependent on the setting of said manually adjustable movable means, restraining means operated by said transmission selector means and operatively associated with said positioning means for automatically rendering said positioning means inoperative in relation to said control means whenever said selector means is placed at least in one non-driving position, manually releasable safety means to maintain said inoperative status of said positioning means in relation to said control means after said selector means is again placed in said driving position, said restraining means automatically enabling said positioning means and said control means to be engaged after said selector member is moved into at least said driving position and after said safety means is released manually by the vehicle operator.

31. In a control device for an automotive vehicle having an engine, said vehicle having brake-actuating means and having engine control means normally urged toward the idle speed position, the combination of, means including movable means for positioning said control means, release means operatively associated with said brake-actuating means to effectively inactivate said positioning means with respect to said control means after movement of said brake-actuating means to a first predetermined position thereof, restraining means to render said positioning means in an inoperative status with respect to said control means only after movement of said brake-actuating means to a second predetermined position thereof, whereby said movement of said brake-actuating means to said first predetermined position thereof effects said release of said positioning means into said inactive status without operating said restraining means, and said movement of said brake-actuating means to said second position thereof effects operation of said restraining means to establish said inoperative status of said positioning means in relation to said control means, manually controlled means associated with said restraining means in a first operational step to terminate the inoperative status of said positioning means with respect to said control means without operatively engaging said control means, and in a second operational step to enable automatic operative engagement of said positioning means with respect to said control means after a normal movement of said control means in an increase-speed direction, and said manually controlled means being disposed also to enable said automatic operative engagement of said positioning means with respect to said control means after only said first-named inactivating movement of said brake-actuating means without requiring manual operation of said manually controlled means whenever it is desired to temporarily reduce vehicle speed.

32. The combination of means defined in claim 31, in which said restraining means includes latch means having an element movable in accordance with movements of said brake-actuating means, said latch elements being engaged only upon movement of said brake-actuating means to said second position, and remaining out of engagement upon movement of said brake-actuating means to said first position.

33. In a control device for an automotive vehicle having an engine, said vehicle having brake-actuating means and having engine control means normally urged toward the idle-speed position by biasing means, the combination of, means including movable means for positioning said control means for establishing the speed of the vehicle, release means operatively associated with said brake-actuating means to effectively inactivate said positioning means with respect to said control means after movement of said brake-actuating means to a first predetermined position thereof, restraining means to render said positioning means in an inoperative status with respect to said control means only after movement of said brake-actuating means to a second predetermined position thereof, said release means including means operable upon said movement of said brake-actuating means to said first predetermined position thereof to effect said release of said positioning means into said inactive status without operating said restraining means, and upon said movement of said brake-actuating means to said second position thereof to effect operation of said restraining means to establish said inoperative status of said positioning means in relation to said control means.

34. In a control device for an automotive vehicle having an engine, said vehicle having brake-actuating means and having engine control means normally urged toward the idle-speed position by biasing means, the combination of, means including movable means for positioning said control means in a predetermined position thereof, release means operatively associated with said brake-actuating means to effectively inactivate said positioning means with respect to said control means after movement of said brake-actuating means to a first predetermined setting thereof, said positioning means including means to effect automatic operative engagement thereof with said control means after movement of said control means in an increase speed direction to a second predetermined position beyond said first-named predetermined position, and said last-recited means including means to enable said biasing means to move said operatively engaged positioning means and control means in an idle speed direction to said first predetermined position for holding said control means in said first position, restraining means to render said positioning means inoperative with respect to said control means only after movement of said brake-actuating means to a second predetermined setting thereof, said release means including means operable upon said movement of said brake-actuating means to said first predetermined setting thereof to effect said release of said positioning means into said inactive status without operating said restraining means, and upon said movement of said brake-actuating means to said second setting thereof to effect operation of said restraining means to establish said inoperative status of said positioning means in relation to said control means.

35. In a control device for an automotive vehicle including an engine and movable control means therefor normally urged toward the idle-speed position by biasing means, the combination of, a mechanism for setting said control means in selected fixed positions, said mechanism having speed-adjusting means comprising a manually rotatable speed selector member mounted in the operator's compartment, said mechanism also including positioning means operatively connected to said speed selector member and including threaded means to provide axial movements of said positioning means by rotation of said speed selector member for setting any desired said fixed position of said control means without visual inspection thereof, said threaded means having a fast thread rate providing a relatively long travel of said positioning means for each rotation of said speed selector member, said last named member including a single tactile indicator adjacent its periphery to indicate by the sense of touch the angular position of said selector member to enable the vehicle-operator to select the approximate speed of said vehicle by feeling said angular position of said selector member without removing his sight from the road, said positioning means including means to effect automatic operative engagement thereof with said control means after movement of said control means in an increase-speed direction to a position always the same predetermined distance beyond said fixed position irrespective of the speed-setting positions of said positioning means, and said automatic engagement means including means to enable said biasing means to move said operatively engaged positioning means and control means in an idle speed direction to said fixed position for holding said control means in said fixed position.

36. In a control device for an automotive vehicle including an engine and movable control means therefor normally urged toward the idle-speed position by biasing means, the combination of, a mechanism for setting said control means in selected fixed positions, said mechanism having speed-adjusting means comprising a manually rotatable speed selector member mounted in the operator's compartment, said mechanism also including positioning means operatively connected to said speed selector member and including threaded means to provide axial movements of said positioning means by rotation of said speed selector member for setting any desired said fixed position of said control means without visual inspection thereof, said threaded means having a fast thread rate providing a relatively long travel of said positioning means for each rotation of said speed selector member, said last named member including a single tactile indicator adjacent its periphery to indicate by the sense of touch the angular position of said selector member to enable the vehicle-operator to select the approximate speed of said vehicle by feeling said angular position of said selector member without removing his sight from the road, and said mechanism including means to impose a controlled friction force on said positioning means to prevent the force of said biasing means from causing said positioning means to move undesirably in an idle-speed direction due to the fast thread rate of said threaded means.

37. In a control device for an automotive vehicle having an engine, said vehicle having brake-actuating means and having engine control means normally urged toward the idle-speed position by biasing means, the combination of means to hold said control means in any desired predetermined first position comprising, movable means for positioning said control means in said first position, release means operatively associated with said brake-actuating means to effectively inactivate said positioning means with respect to said control means after a predetermined movement of said brake-actuating means, said holding means including means to effect automatic operative engagement of said positioning means with said control means after movement of said control means in an increase-speed direction to a second predetermined position beyond said first position, one of aforesaid means including means providing an audible signal to indicate said operative engagement, said automatic-engagement means including lost-motion means to enable said biasing means to move said operatively engaged positioning means and control means in an idle-speed direction to said first predetermined position for holding said control means in said first position, said holding means including speed-adjusting means comprising a manually rotatable speed selector member mounted in the operator's compartment, said positioning means being operatively connected to said speed selector member and including threaded means to provide axial movements of said positioning means by rotation of said speed selector member for setting any desired fixed position of said control means without visual inspection thereof, said selector member including a single tactile indicator adjacent its periphery to indicate by the sense of touch the angular position of said selector member to enable the vehicle-operator to select the approximate speed of said vehicle by feeling said angular position of said selector member without removing his sight from the road.

38. In a control device for an automotive vehicle having an engine, said vehicle having brake-actuating means and having engine control means, and said vehicle including an element manually movable by the vehicle-driver, the combination of movable means including means to position said control means for establishing the speed of the vehicle, release means operatively associated with said brake-actuating means to effectively inactivate said positioning means with respect to said control means after a predetermined movement of said brake-actuating means, restraining means operatively associated with said positioning means and operable in response to said movements of said element to automatically render said positioning means inoperative with respect to said control means, and safety means operatively associated with said restraining means and including mechanical latch means to maintain said positioning means in said inoperative status, said safety means including manually operated means to enable the vehicle-driver to deliberately release said latch means at least once each time the vehicle is first operated.

39. In a control device for an automotive vehicle having an engine, said vehicle having brake-actuating means and having engine control means including spring means to urge said control means toward its idle-speed position, and said vehicle including an element manually movable by the vehicle-driver, the combination of means to hold said control means in any desired predetermined position comprising, movable means including means to position said control means for establishing the speed of the vehicle, release means operatively associated with said brake-actuating means to cause inactivation of said positioning means with respect to said control means after a predetermined movement of said brake-actuating means, said movable means including lost-motion means to enable automatic operative engagement of said positioning means with said control means after movement of said control means in its increase-speed direction to a second predetermined position beyond said first position on the high-speed side thereof, said lost-motion means including means to enable said spring means to move said operatively engaged positioning means and said control means in its idle-speed direction to said first predetermined position for holding said control means in said first position, restraining means operatively associated with said positioning means and operable in response to said movements of said element to automatically render said positioning means inoperative with respect to said control means, and safety means operatively associated with said restraining means and including mechanical latch means providing a detent action as a result of said operation of said restraining means to maintain said positioning means in said inoperative status, said safety means including manually operated means to enable the vehicle driver to deliberately release said latch means at least once each time the vehicle is first operated.

40. In a control device for an automotive vehicle having an engine, said vehicle having brake-actuating means and also having engine control means normally urged toward the idle-speed position by biasing means, the combination of, movable means for positioning said control means to establish the speed of the vehicle, release means operatively associated with said brake-actuated means to effect inactivation of said movable means with respect to said control means after a predetermined travel of said brake-actuating means, means operatively associated with said movable means to effect automatic operative engagement of said positioning means and said control means after movement of said control means in an increase-speed direction to a position beyond said idle-speed position, sound-producing means operatively associated with said movable means and including leaf-spring clicker means operable upon said automatic engagement to provide an audible signal for indicating that said operative engagement has been effected.

41. In a control device for an automotive vehicle having an engine, said vehicle having brake-actuating means and having engine control means normally urged toward the idle-speed position by biasing means, the combination of means to hold said control means in any desired predetermined first position comprising, movable means for positioning said control means in said first position, release means operatively associated with said brake-actuating means to effect inactivation of said positioning means with respect to said control means after a predetermined movement of said brake-actuating means, said holding means including lost motion means to effect automatic operative engagement of said positioning means and said control means after movement of said control means in an increase-speed direction to a second predetermined position beyond said first position, one of said means including means providing an audible signal to indicate said operative engagement, said lost-motion means including means to enable said biasing means to move said operatively engaged positioning means and control means in an idle-speed direction to said first predetermined position for holding said control means in said first position, and one of said aforesaid means being disposed to provide an audible signal to indicate inactivation of said positioning means with respect to said control means, and restraining means operatively associated with said positioning means and operable in response to said movements of said element to automatically render said positioning means inoperative with respect to said control means.

42. In a control device for an automotive vehicle having an engine, said vehicle having brake-actuating means and also having engine control means normally urged toward the idle-speed position by biasing means, the combination of, movable means including means for positioning said control means to establish the speed of the vehicle, release means operatively associated with said brake actuating means to effect inactivation of said movable means with respect to said control means after a predetermined travel of said brake-actuating means, means operatively associated with said movable means to effect automatic operative engagement of said positioning means and said control means upon movement of said control means in an increase-speed direction to a position beyond said idle-speed position, at least one of said means including sound-producing means operable upon said automatic engagement to provide an audible signal for indicating that said operative engagement has been effected, and restraining means operatively associated with said positioning means and operable in response to said movements of said element to automatically render said positioning means inoperative with respect to said control means.

References Cited in the file of this patent
UNITED STATES PATENTS

| | | | |
|---|---|---|---|
| 145,641 | Fritsch | Dec. 16, | 1873 |
| 1,436,154 | Dickerson | Nov. 21, | 1922 |
| 1,633,798 | Taylor | June 28, | 1927 |
| 1,652,794 | Piel | Dec. 13, | 1927 |
| 2,609,074 | Leihgeber | Sept. 2, | 1952 |
| 2,621,766 | Patrick | Dec. 16, | 1952 |
| 2,742,123 | Exline | Apr. 17, | 1956 |
| 2,853,164 | Sturdy | Sept. 23, | 1958 |
| 2,912,082 | Wooten | Nov. 10, | 1959 |